F. R. McBERTY.
CONTROL SYSTEM FOR AUTOMATIC TELEPHONE SWITCHES.
APPLICATION FILED DEC. 7, 1912.
1,100,385.
Patented June 16, 1914.
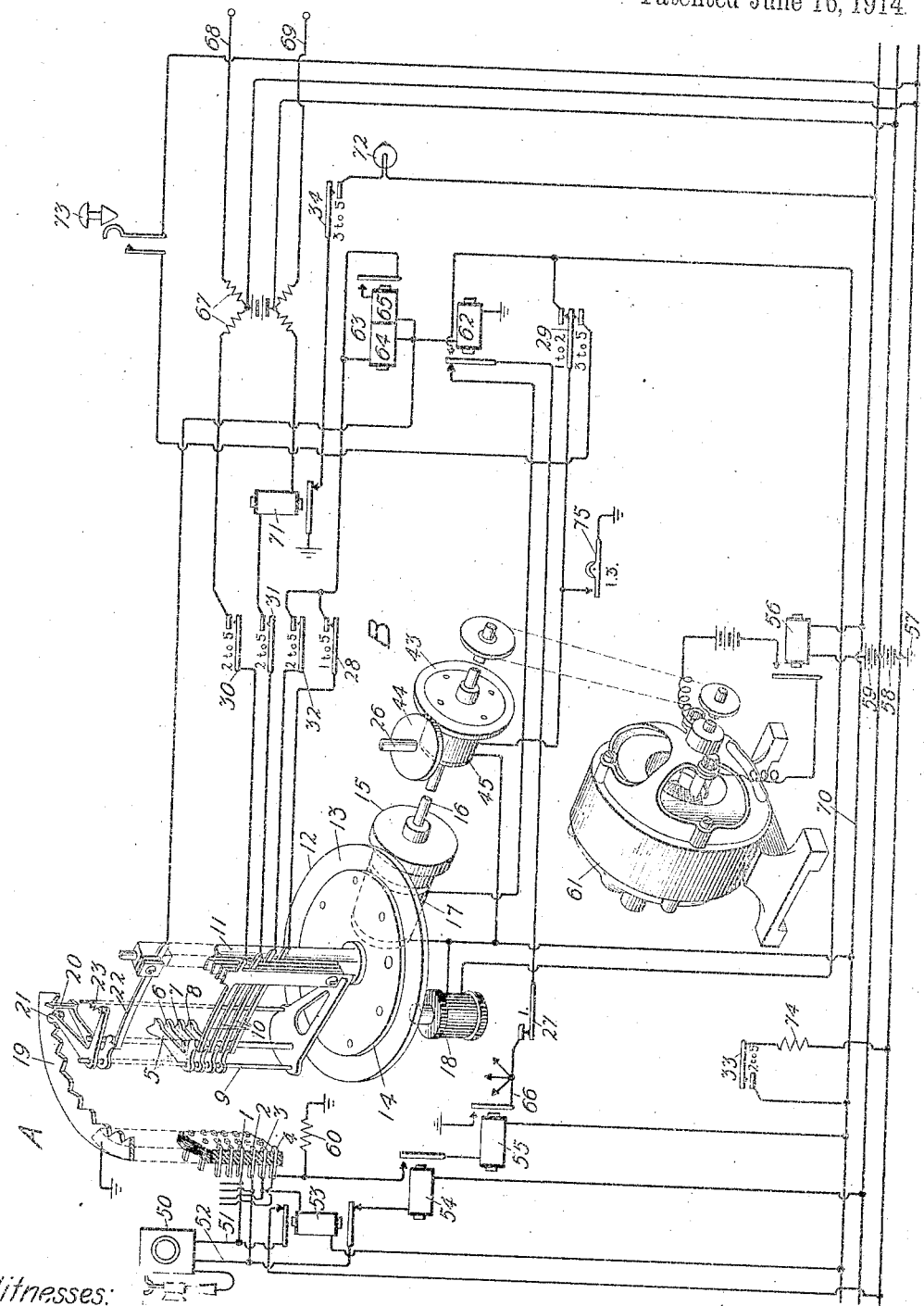
Witnesses:
Inventor:
Frank R. McBerty

UNITED STATES PATENT OFFICE.

FRANK ROBERT McBERTY, OF ANTWERP, BELGIUM, ASSIGNOR TO WESTERN ELECTRIC COMPANY, OF NEW YORK, N. Y., A CORPORATION OF ILLINOIS.

CONTROL SYSTEM FOR AUTOMATIC TELEPHONE-SWITCHES.

1,100,385.

Specification of Letters Patent. Patented June 16, 1914.

Application filed December 7, 1912. Serial No. 735,420.

*To all whom it may concern:*

Be it known that I, FRANK R. MCBERTY, a citizen of the United States, residing at Antwerp, in the Province of Antwerp and Kingdom of Belgium, have invented a certain new and useful Improvement in Control Systems for Automatic Telephone-Switches, of which the following is a full, clear, concise, and exact description.

This invention relates to power-driven switching apparatus or selectors for automatic or semi-automatic telephone systems and its object is to avoid unnecessary running of the switch driving mechanisms. To this end the circuit of a motor or other power-controlling device is arranged to be closed, by a so-called power relay or other suitable means, the winding or magnet coil of which is included in the path of battery supply to the several circuits of the system. In consequence of this arrangement, the relay is energized and the motor or controlling device is operated to start the power mechanism for the switches whenever a circuit is closed at any point of the system. The battery wire including the winding of the power relay may be arranged to supply the current to line relays actuated by the removing of the receivers of subscribers to initiate calls and this is preferable in order that the power mechanism for the switches may begin to move as soon as any call comes in.

In systems where the automatic switches are controlled through the medium of magnetic clutches, the current to the electromagnets of such clutches may be also supplied through the winding of the motor starting relay, thus insuring the starting of the motor simultaneously with the excitation of the clutch magnets.

In order to avoid unnecessary starting and stopping of the motor or power-controlling device in making up a connection and during conversation the principal controlling switches for the selectors, known as sequence switches, are provided with contacts which are closed, to complete the circuit of the power relay, except when the sequence switches are in normal position. These contacts thus serve to maintain the motor active, when once started, until the sequence switch is returned to normal position.

Preferably, the automatic switches in a telephone system embodying this invention are divided into groups, each group being provided with a separate motor or power-controlling device and a separate power relay for starting the motor or exciting the controlling device so that the arrival of a call will cause only the motor or controlling device of a single group to be operated.

The invention may be embodied in systems of various types, one embodiment being shown in the accompanying drawing which represents part of the system of circuits of a semi-automatic telephone exchange.

Two automatic switches A and B are indicated in the drawing. A, usually referred to as a "selector," distributes the incoming calls by connecting the contacts of the calling line to a connecting circuit of an answering operator. Contacts 1, 2, 3, 4 of this selector associated with a subscriber's line are secured in a block of insulating material supported in a frame which is not shown. Brushes 5, 6, 7, 8 for coöperation with the contacts are pivoted on axis 9 and pressed against the contacts by springs 10.

The current is conducted to the brushes through the springs 10, which are insulated from each other and from the square shaft 11 by means of strips of insulating material. Furthermore, the springs are not connected to the lines in the simple manner shown but through collector rings and brushes in a well known way. The brushes 5, 6, 7, 8 are also insulated from their shaft 9. The selector is revolved by means of the disk 12 consisting of a magnetic iron ring 13 and a flexible metal plate 14. At right angles to this disk is an iron disk 15 fastened to a shaft 16 driven by the motor 61. Adjacent the ring 13 and disk 15 a magnet 17 is situated which when excited causes the ring 13 to be attracted to the disk 15 so that the revolving shaft 16 rotates the disk 12 by means of friction. An electromagnet 18 when excited serves to stop the selector at the desired position. As soon as this magnet is excited it attracts the disk 12 causing the ring 13 to be held and locked against the end of its core.

At the upper part of the selector there is a device consisting of a plate 19, provided with teeth and spaces, and two brushes 20 and 21. The brushes 20 and 21 are pressed against the plate 19 by the springs 22 and 23. Whenever brush 20 touches a tooth, contact between it and the plate is closed. This contact is open, however, when brush 20 occupies a position intermediate any two adjacent teeth. The brush 21 by engaging the spaces between teeth in the plate 19 serves to insure accurate stopping of the brushes 5, 6, 7, 8 on the fixed contacts of the selector. The contact between brush 20 and plate 19 serves to close a short circuit about the relay 62 every time the brushes 5, 6, 7, 8 are between contacts. This short circuit is interrupted, however, when the brushes are exactly opposite the contacts thereby permitting the selector to be stopped only when the brushes touch the contacts.

The other automatic switch B, usually referred to as a "sequence switch," serves to open and close the talking and other conductors of the connecting circuit when required during the different phases of making a connection. It consists of a vertical shaft 26 carrying a number of notched disks (not shown) and spring contacts 27 to 34 shown schematically at convenient points in the circuit diagram. These contacts are closed by the notched disks at various points or steps away from normal as indicated by the numbers adjacent each contact.

The sequence switch is operated through the medium of the magnetic clutch 43, 44, actuated by the electromagnet 45. The disk 43 like 12 is composed of an iron ring and a flexible metal plate which bends under the influence of the magnet 45 allowing the ring to touch the rim of disk 44. A number of temporary stopping positions are assumed by the sequence switch. In the system disclosed they are positions 1 and 3. A contact device 75, open only at these positions, as indicated by the numbers placed on the opposite side of 75 from the contact, prevents the sequence switch from stopping at any other than these temporary stopping positions. The contact is closed, to complete the energizing circuit of magnet 45, at all other times including the intermediate positions 2, 4 and 5, over which the switch passes without stopping.

The line wires 51, 52 of subscriber 50 are shown in normal condition, the receiver being on the hook and the wires connected to battery and ground through the back contacts of a cut-off relay 53 and the winding of a line relay 54. The line wires also lead to the contacts 1 and 2 of the selector A. By lifting the receiver the line circuit is closed, relay 54 operates and closes circuit through group relay 55 which is connected to battery supply wire 70 and is thus in series with power relay 56. The circuit of these relays is from ground 57 over the batteries 58, 59, winding of relay 56, wire 70, winding of relay 55, the contact of relay 54, and resistance 60 to ground. Power relay 56, which is of low resistance, being operated in this circuit closes the circuit of the motor 61, thereby starting the latter. At the same time relay 55 closes circuit from ground to conductor 66, contact 27 of sequence switch B (now in position 1), back contact of a test relay 62, winding of clutch magnet 17, winding of power relay 56, batteries 59, 58 to ground 57. By the excitation of magnet 17 the selector A is started. The test brush 8 of selector A is connected to ground over contact 28 of the sequence switch, a high resistance winding 64 of relay 63 and winding of relay 62. As long as this brush is in engagement with some contact 4 of a subscriber's line which is not "calling" or is "busy," relay 63 will remain unoperated and the selector will travel on, for in the case of a line not calling and not connected to there will be no circuit from battery to energize the relay, while in the case of a busy line, where for example, some other selector like A has made connection with such line, there will have been a low resistance connection to a multiple of contact 4 through low resistance relay winding 65 and 62 of the other selector effectually shunting the high resistance winding 64 of relay 63 of the testing selector so that insufficient current can flow through it to effect its operation. But as soon as the test brush 8 touches contact 4 of a calling subscriber, which contact previously had been connected to the battery wire 70 through relay 55 and the contact of relay 54 by the operation of the latter, winding 64 of relay 63 receives sufficient current to cause its operation. When so operated, it puts the low resistance winding 65 in multiple with the high resistance winding 64, and reduces considerably the resistance of the circuit through relay 62. As soon as the brushes 5 to 8 are exactly opposite contacts 1 to 4 of the calling line, contact between plate 19 and brush 20 then being broken, relay 62 attracts its armature, thereby first interrupting the circuit of magnet 17, leading through the back contact of this relay, and then connecting the magnet 18, through the front contact of this relay, with the ground wire through contact 27, conductor 66 and front contact of relay 55. Selector A is thereby stopped. Simultaneously with the energization of magnet 18 a circuit is established for magnet 45 from ground 57, batteries 58, 59, relay 56, conductor 70, magnet 45, upper contact 29 of the sequence switch B, front contact of relay 62, sequence switch contact 27, conductor 66, and front contact of relay 55 to ground. This circuit merely serves to start the movement of sequence switch B from its normal or first temporary stopping position 1. It continues to revolve, however, until it reaches the next temporary stopping position 3, the circuit for magnet 45 being completed through contact 75 as soon as the sequence switch moves from its normal position and remaining closed until it reaches position 3, when contact 75 opens and magnet 45 becomes deënergized.

In the first position of the sequence switch B contacts 27, 28 and upper contact of 29 only are closed, while contacts 30, 32 and others are open. The closing of contact 32 in the second position causes cut-off relay 53 to be energized in a circuit from ground 57 over the batteries 58, 59, winding of power relay 56, battery wire 70, relay 53, contact 3 of selector A, brush 7, contact 32, windings 64, 65 of relay 63, winding of relay 62 to ground. Relay 53 cuts the line relay 54 off and opens the ground and battery leads to wires 51, 52 of the calling subscriber. Relay 55 is released and opens the circuit through wire 66 leading to the selector. Line wires 51, 52 of subscriber 50 are now connected to the repeating coil 67 through contacts 30, 31 thereby enabling the operator, whose telephone set may be connected to the wires 68, 69, to obtain the number of the subscriber wanted. Thereupon the operator establishes the desired connection.

Contact 33 in closing completes a circuit through batteries 58, 59, winding of power relay 56, wire 70, contacts 33 and resistance 74 to ground 57. This circuit is for the purpose of insuring the operation of relay 56 even when all other wires fed from battery 59 are open; it is closed in all positions of the sequence switch except the first. Attention is called to the fact that in the arrangement shown in the drawing the current through relay 56 is renewed by closing new circuits before the original circuit or one of the previously closed circuits of this relay is opened. This arrangement is of course unnecessary and the circuits not necessary for the operation of this relay can be branched off from battery direct. The arrangement shown is chosen to show a number of circuit combinations in a single detailed example.

The return of the switches shown in the drawing to their respective home positions and the stopping of the motor can be effected in any desired manner. Lamp 72 is lighted when the circuit of supervisory relay 71, energized during the continuance of the conversation, is opened by the subscriber 50 hanging up his receiver. The circuit of lamp 72 is from batteries 58, 59, through relay 56, contact 34 and the back contact of relay 71 to ground. Receiving this signal, the operator presses key 73 and completes a circuit from ground 57 through key 73, lower contact 29, magnet 45, line 70 and relay 56 to battery, thus starting the revolution of sequence switch B by means of magnet 45. Contact 75 closes as soon as the sequence switch moves from its temporary stopping position 3 and maintains the energizing circuit of magnet 45 closed until the sequence switch arrives at its other temporary stopping position 1. Contact 75 and all the other sequence switch contacts except 27 are open in this position and the apparatus is ready to make up another connection. It will be noted that contact 33 is open, that relay 53 is unoperated owing to opening of contact 32, and that relays 54 and 55 also are unoperated because the subscriber had hung up his receiver. Thus all circuits branched off battery wire 70 are opened and motor relay 56 stops the motor provided no other subscriber has called meanwhile.

A plurality of selectors connected as indicated to wire 66 in the manner of selector A may be employed in accordance with the traffic requirements. In larger systems it is advisable to combine the selectors in groups and to provide each group with a separate motor or other power controlling magnet so that only that part of the system is put into operation in which a call comes in or a connection is desired or established

I claim—

1. In a telephone exchange system the combination with an automatic switch, a sequence switch associated therewith, power mechanism therefor adapted for continuous operation and clutches for connecting said power mechanism with said switches, of circuits for the control of said clutches, a common source of current supply for said circuits and means included in the path of said current adapted to control the operation of said power mechanism and cause its continued operation until said sequence switch returns to its home position.

2. In a telephone exchange system the combination with automatic switches and power mechanism therefor, of subscribers' lines, line relays therefor, electromagnetic devices for controlling the operation of said switches, circuits for said relays and said devices, a common source of current supply for said circuits and means included in the path of said current adapted to start and stop the power mechanism.

3. In a telephone exchange system the combination with a plurality of automatic switches, sequence switches associated therewith, power mechanism therefor adapted for continuous operation and a clutch for connecting the power mechanism with each switch, of a motor adapted to drive the power mechanism, a source of current supply for the various circuits of the system and means included in the path of said current for starting said motor and for stopping said motor when all of said sequence switches have returned to their home position.

4. In a telephone exchange system the combination with a plurality of automatic switches, power mechanism therefor adapted for continuous operation and a clutch for connecting said power mechanism with each switch, of subscribers' lines, line relays therefor, circuits for the control of said relays and of the clutches, a source of current supply for said circuits and means included in the path of said current adapted to start and stop the power mechanism.

5. In a telephone exchange system the combination with a plurality of automatic switches, sequence switches associated therewith, power mechanism therefor adapted for continuous operation, a clutch for connecting the power mechanism with each switch, a motor for driving said power mechanism, a relay adapted to close the circuit of said motor as long as one of said sequence switches is out of its home position, circuits associated with said switches for controlling their operation, and a current supply conductor including the winding of said relay, said circuits forming branches of said conductor.

6. In a telephone exchange system the combination with a selector and power mechanism therefor adapted for continuous operation, of electromagnetic devices for the control of the various circuits of said system, a sequence switch for changing the circuits during the operation of the selector and a local circuit and device therein adapted to control the operation of the power mechanism, said local circuit being under the control of said sequence switch.

7. In a telephone exchange system, the combination with automatic switches, power mechanism adapted to drive said switches, a common source of current for said system, and means actuated whenever current is flowing in said system to start and maintain in motion said power mechanism, and means for coupling said switches to said power mechanism.

8. In a telephone exchange system, the combination with a plurality of lines, an automatic switch for interconnecting the same, a motor for driving said switch, and a relay adapted to be energized upon the initiation of a call to start said motor in motion, and means for maintaining said motor active while a call is in progress.

9. In a telephone exchange system, the combination with a plurality of lines, an automatic switch for interconnecting the same, an electromechanism adapted to govern the movements of said switch, power mechanism for driving said automatic switch and said electromechanism, means for coupling said switch and electromechanism to said power mechanism, and means adapted to render and maintain active said power mechanism only while a call is being established, pending conversation, and is being disestablished.

10. In a telephone exchange system, the combination with a plurality of lines, an automatic switch for interconnecting the same, power mechanism for driving said switch, means for coupling said switch to said power mechanism, and means adapted to render and maintain active said power mechanism only while a call is being established, pending conversation, and is being disestablished.

In witness whereof, I hereunto subscribe my name this 6th day of December A. D., 1912.

FRANK ROBERT McBERTY.

Witnesses:
ELLA EDLER,
WALTER F. HOFFMAN.